United States Patent [19]

Wilde et al.

[11] 4,360,873
[45] Nov. 23, 1982

[54] POWER SELECTION SYSTEM FOR A CONSIST OF LOCOMOTIVES

[75] Inventors: Calvin D. Wilde, Foster City; Daniel L. Turner, Belmont, both of Calif.

[73] Assignee: SAB Harmon Industries, Inc., Grain Valley, Mo.

[21] Appl. No.: 185,604

[22] Filed: Sep. 9, 1980

Related U.S. Application Data

[63] Continuation-in-part of Ser. No. 18,167, Mar. 7, 1979, Pat. No. 4,234,922.

[51] Int. Cl.³ ............... G05D 13/62; G06G 7/66; B60L 15/32
[52] U.S. Cl. .................. 364/426; 105/61; 246/182 R; 246/187 C; 364/431.01
[58] Field of Search .......... 364/424, 426, 442, 431.01; 246/182 R, 182 C, 186 R, 187 R; 105/61

[56] References Cited

U.S. PATENT DOCUMENTS 4,253,399  3/1981  Spigarelli ................... 105/61 X
4,266,485  5/1981  Bruner et al. .................. 105/61

Primary Examiner—Felix D. Gruber
Attorney, Agent, or Firm—D. A. N. Chase; Michael Yakimo, Jr.

[57] ABSTRACT

The number of on-line locomotives of a consist is either reduced or increased by a manual control system that conserves fuel by throttling back trailing locomotives and operating the remaining locomotives of the consist at the most efficient throttle position. A control unit in the lead locomotive is operated by the engineer to command control units in equipped trailing locomotives of the consist. Each time the engineer depresses a "subtract power" push button, one trailing locomotive is throttled back; conversely, each time an "add power" push button is depressed, a trailing locomotive is returned on line by advancing its throttle to the most efficient position. A cutout control signal, which is generated in the lead locomotive and transmitted to trailing units in serial order (front to rear) by a single spare trainline wire, has voltage levels that progressively decrease or increase in response to the subtract or add power commands. These voltage levels are decoded by each trailing unit and the throttles are set accordingly. The trailing units also cause these voltage levels to drop by a fixed amount as the control signal is conducted by the trainline wire rearwardly in the consist from each trailing unit to the next succeeding trailing unit. In this manner, locomotives are successively throttled back from the rear of the consist and returned on line from the front. An interrogation signal is periodically transmitted along the trainline, and the trailing units respond sequentially to report the on-line or off-line status of the locomotives. Once a report indicates that a trailing locomotive has been cut out or put on line, the lead unit ceases the progressive change in the control signal voltage levels.

23 Claims, 10 Drawing Figures

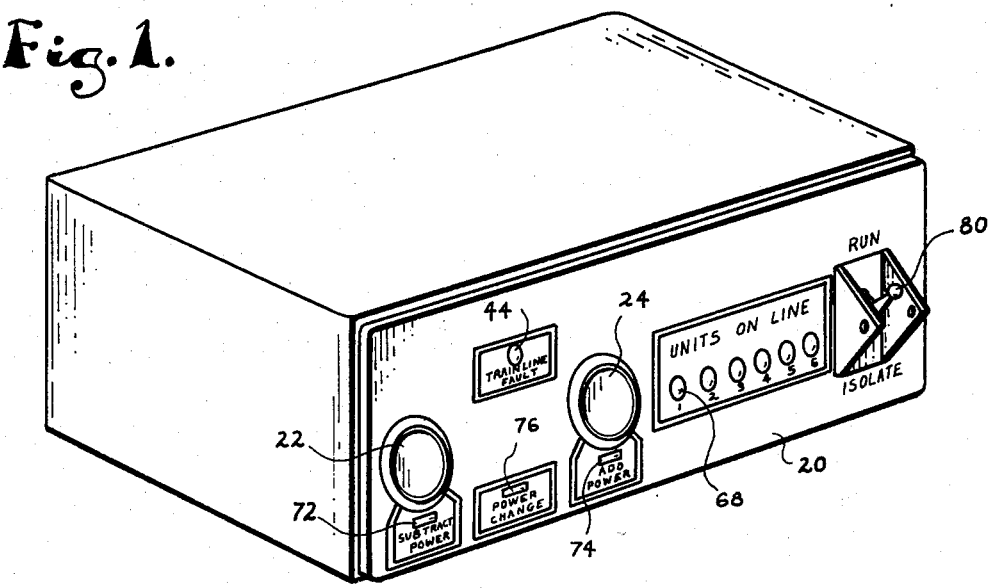
Fig. 1.
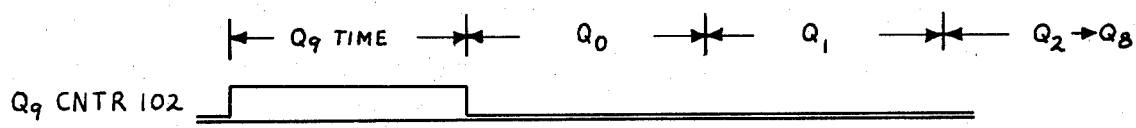
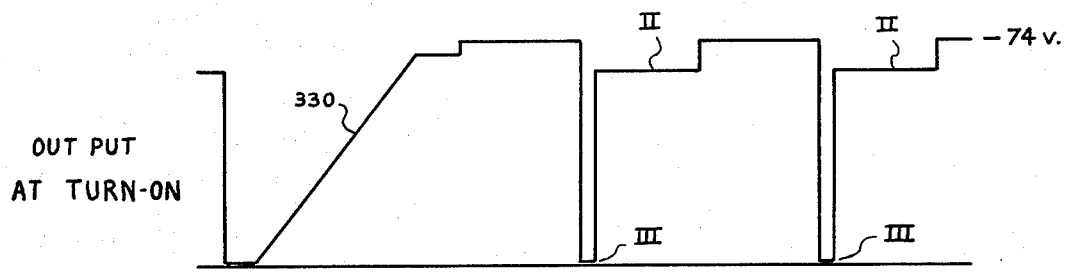
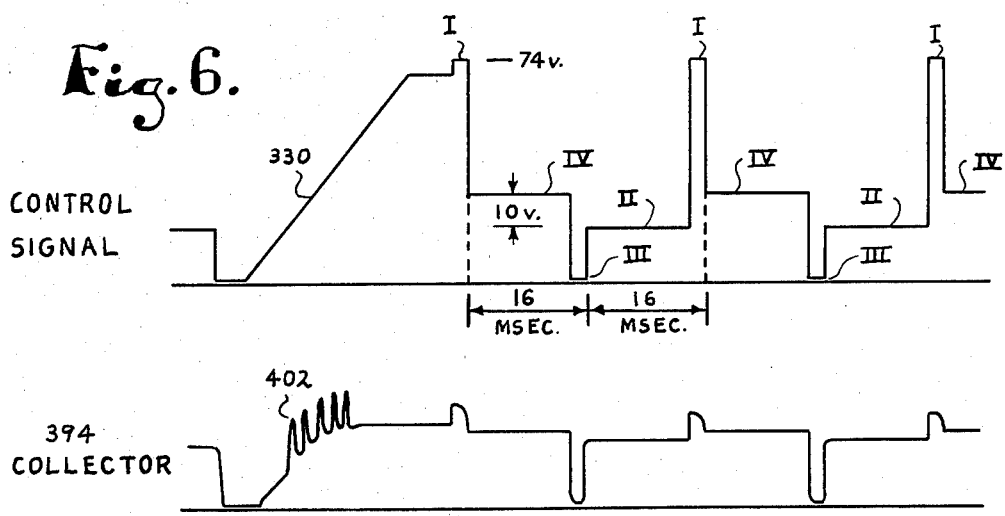
Fig. 6.

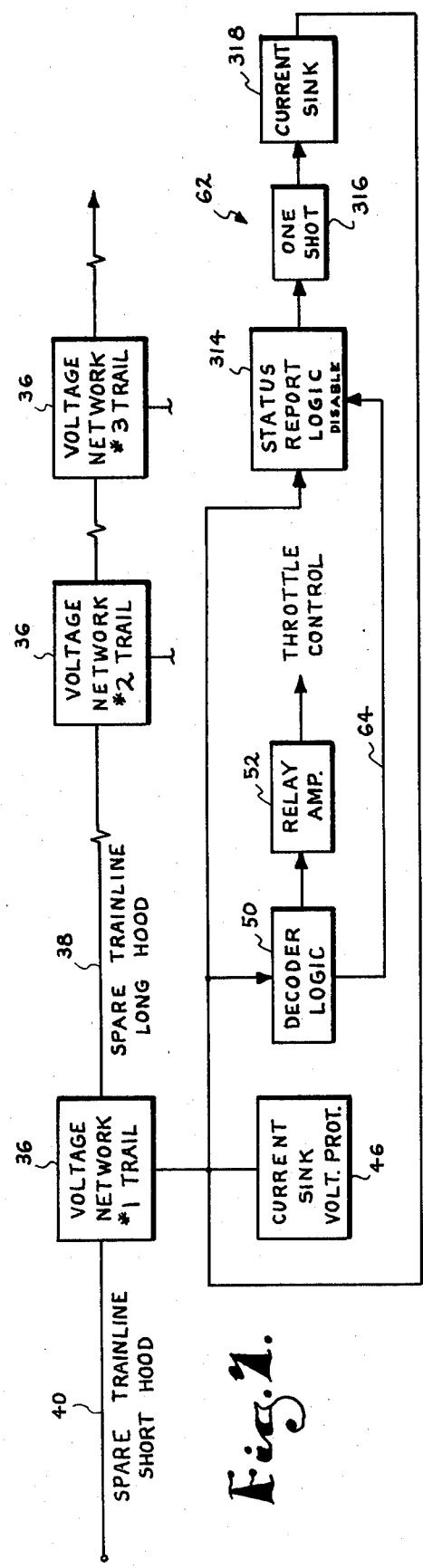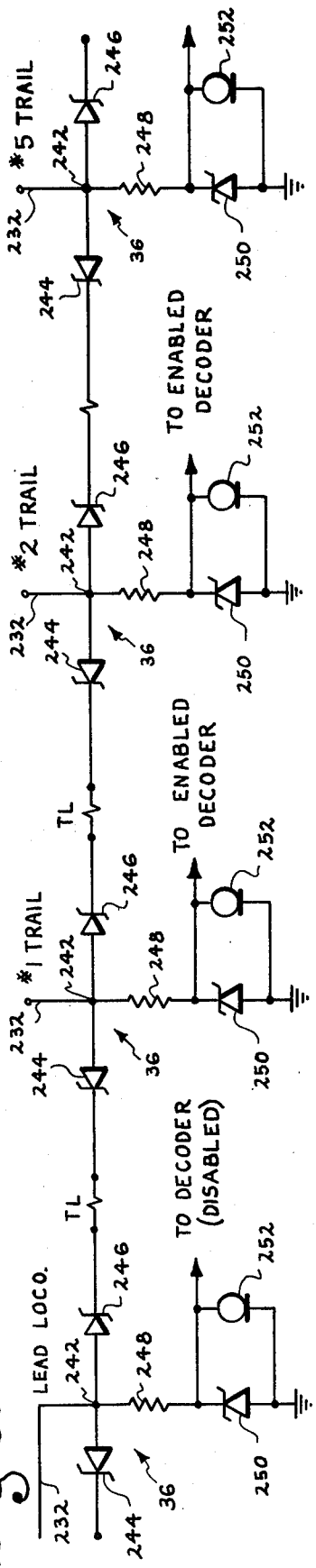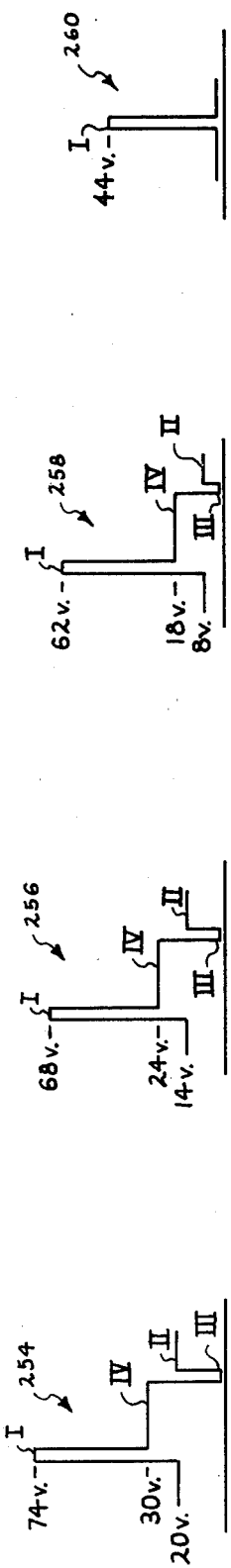

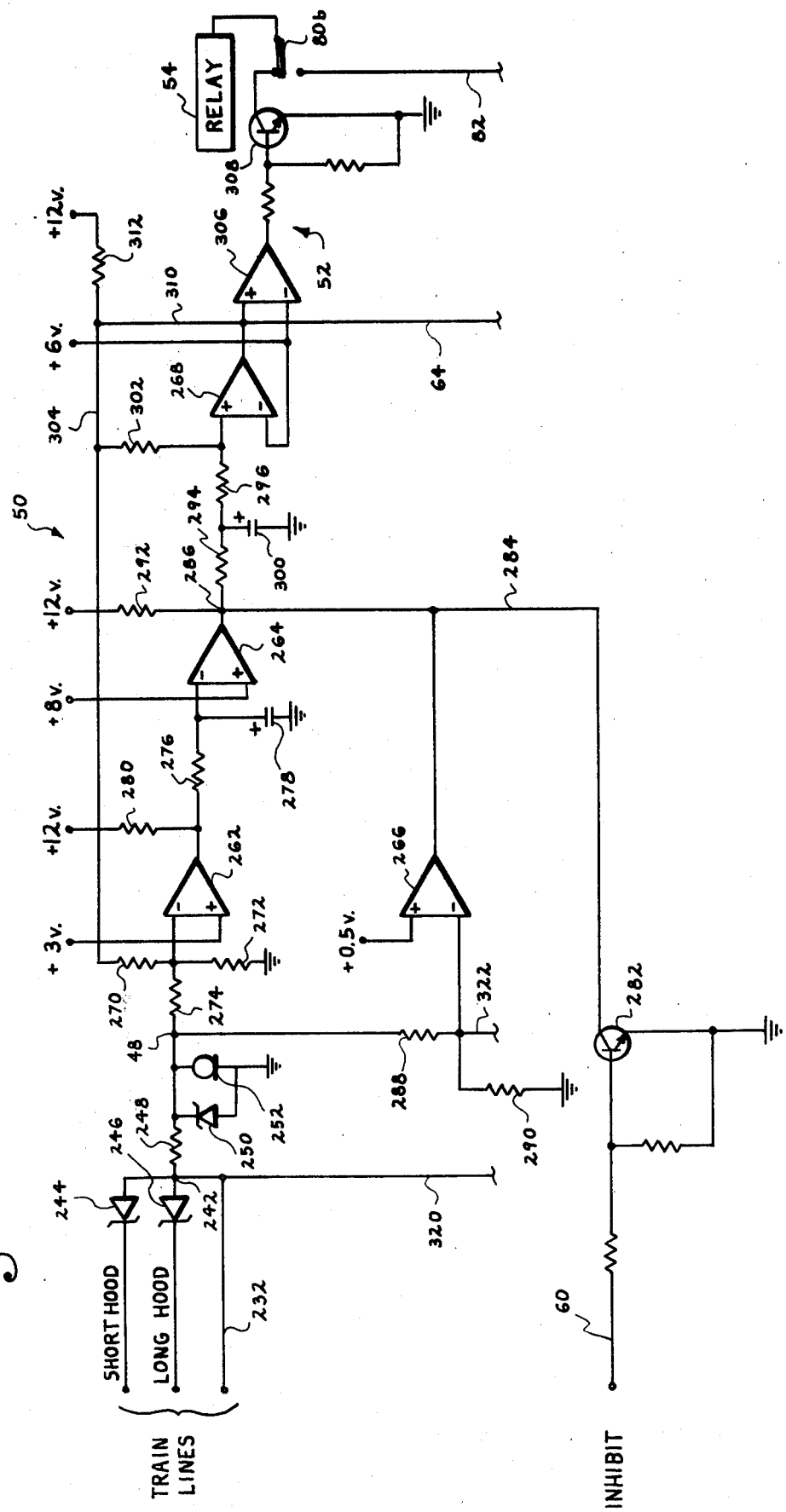

POWER SELECTION SYSTEM FOR A CONSIST OF LOCOMOTIVES

CROSS-REFERENCE

This application is a continuation in part of our copending application, Ser. No. 18,167, filed Mar. 7, 1979, now U.S. Pat. No. 4,234,922 issued Nov. 18, 1980 and entitled "Automatic Locomotive Speed Control."

This invention relates to improvements in speed control systems for diesel locomotives and, in particular, to a manually operated, energy-efficient system which enables the engineer to reduce or add power while maintaining efficient throttle settings and optimum train dynamics and, further, to such a system which reports the on-line or off-line status of the locomotives under control.

Our copending U.S. patent application, Ser. No. 18,167, discloses an automatic speed control system for a consist of diesel locomotives. In that system trailing locomotives are throttled back to the lowest powered throttle position (notch 1) sequentially from the rear toward the front of the consist and, conversely, returned on line in the reverse direction from front to rear. When a given locomotive is on line, its throttle is advanced to the throttle position which provides the most fuel efficient operation. In the case of turbocharged diesel engines, most efficient operation is at the highest throttle position (notch 8). Accordingly, by operating the locomotives only at the most efficient throttle position when on line, a fuel savings is realized as compared with normal manual control where all trailing locomotives in a consist follow the throttle settings of the lead locomotive.

In-service tests on railroads have shown that the automatic system will save substantial fuel as compared with conventionally controlled consists. However, in some instances it is desired that the engineer maintain direct control over the number of locomotives on line, in contrast to the automatic system where the engineer sets the desired speed but otherwise has no direct control over the number of locomotives on line.

It is, therefore, the primary object of the present invention to provide an improved, manually operated speed control system for a consist of locomotives which reduces or adds power at the selection of the engineer by either subtracting from or adding to the number of on-line locomotives, and where each on-line locomotive is operated at the most efficient throttle setting.

As a corollary to the foregoing object, it is an important aim of this invention to provide a manual system as aforesaid which throttles back trailing locomotives, one locomotive at a time, sequentially from the rear of the consist in response to a command from the engineer to subtract power, and wherein locomotives are individually returned on line from the front in response to a command to add power.

Another important object of the invention is to provide a manual power selection system as aforesaid employing control units in the lead locomotive and respective trailing locomotives, wherein only a single spare trainline wire is required as a control line extending from the lead unit (under the control of the engineer) to the units in the trailing locomotives.

Still another important object is to provide a manual power selection system as aforesaid in which a cutout control signal is generated by the lead unit and is transmitted rearwardly along the control line to successive trailing units, and wherein the control signal is modified as it is conducted rearwardly from unit to unit in a manner such that the throttling back of trailing locomotives is effected from the rear of the consist towards the front.

Yet another important object is to provide a manual power selection system as aforesaid which is insensitive to inaccurate component ratings and which does not require close tolerances for reliable operation, in order to assure that a subtract or add power command will reliably cut out a locomotive or return a locomotive on line.

In furtherance of the immediately preceding object, it is a specific aim of the present invention to provide such a system in which the on-line or off-line status of each of the locomotives is periodically reported to the control unit in the lead locomotive, in order to assure that subtract or add power commands are executed.

Furthermore, it is an important object of the present invention to provide a throttle control system (either manual or automatic) for a consist of locomotives, incorporating such status reporting feature in order that the engineer in the lead locomotive may be apprised of the on-line or off-line status of the locomotives of the consist under system control.

Still further, it is an important object of the invention to provide a manually operated power selection system as aforesaid in which the cutout control signal is provided with an identifier pulse portion that is indicative of a valid control signal and that must be detected by the control units in the trailing locomotives in order to effect cutout of a locomotive.

Additionally, other objectives are to provide such a manual system which is compatible with the automatic speed control system disclosed in our aforesaid copending patent application, which will also function with nonequipped locomotives included in the consist, and wherein no set-up addressing of the respective locomotive control units is required for operation, in order to provide a manual power selection system having maximum operational flexibility and versatility.

DESCRIPTION OF THE DRAWINGS

FIG. 1 is a perspective view of the front panel of one of the control units of the system of the present invention, showing the push buttons under the control of the engineer in the lead locomotive and the various panel lights;

FIG. 5 is a logic and schematic diagram illustrating the circuitry that performs the "units on line" function shown in the block diagram of FIG. 2;

FIG. 6 comprises four time related wave form diagrams illustrating the operation of the system;

FIG. 7 is a block diagram illustrating the manner in which the control units in the respective trailing locomotives are connected in series by the spare trainline, and showing the status responder in greater detail;

FIG. 8 is an electrical schematic and wave form diagram showing the voltage networks in the control units of the lead locomotive and the trailing locomotives, and illustrates the six volt drop in the control signal from locomotive to locomotive as the signal is transmitted down the trainline;

FIG. 9 is an electrical schematic diagram of the voltage network, current sink and voltage protection circuitry, decoder logic, and relay amplifier shown in the block diagram of FIG. 2.

THE CONTROL SYSTEM IN GENERAL

Referring initially to FIG. 1, the housing of one of the control units of the system is shown in front perspective so as to reveal the front panel 20 thereof and the command push buttons and panel lights. Two normally open, push button switches are under the control of the operator and each closes mementarily when its button is depressed. Push button 22 is adjacent the left end of the panel and the legend therebeneath ("subtract power") indicates that button 22 is pressed when it is desired to reduce the power of the locomotive consist. An "add power" push button 24 is pressed by the operator when it is desired to increase the power of the consist. As will be discussed, power is reduced by throttling back trailing locomotives from the rear of the consist, while maintaining an efficient throttle setting in the remaining locomotives. Power is added by returning locomotives on line in reverse order, i.e., from front to rear. It should be understood that the command push buttons 22 and 24 are operated only on the control unit in the lead locomotive; although each trailing locomotive controlled by the system is equipped with an identical control unit, these push buttons are inoperative.

Figure 2:
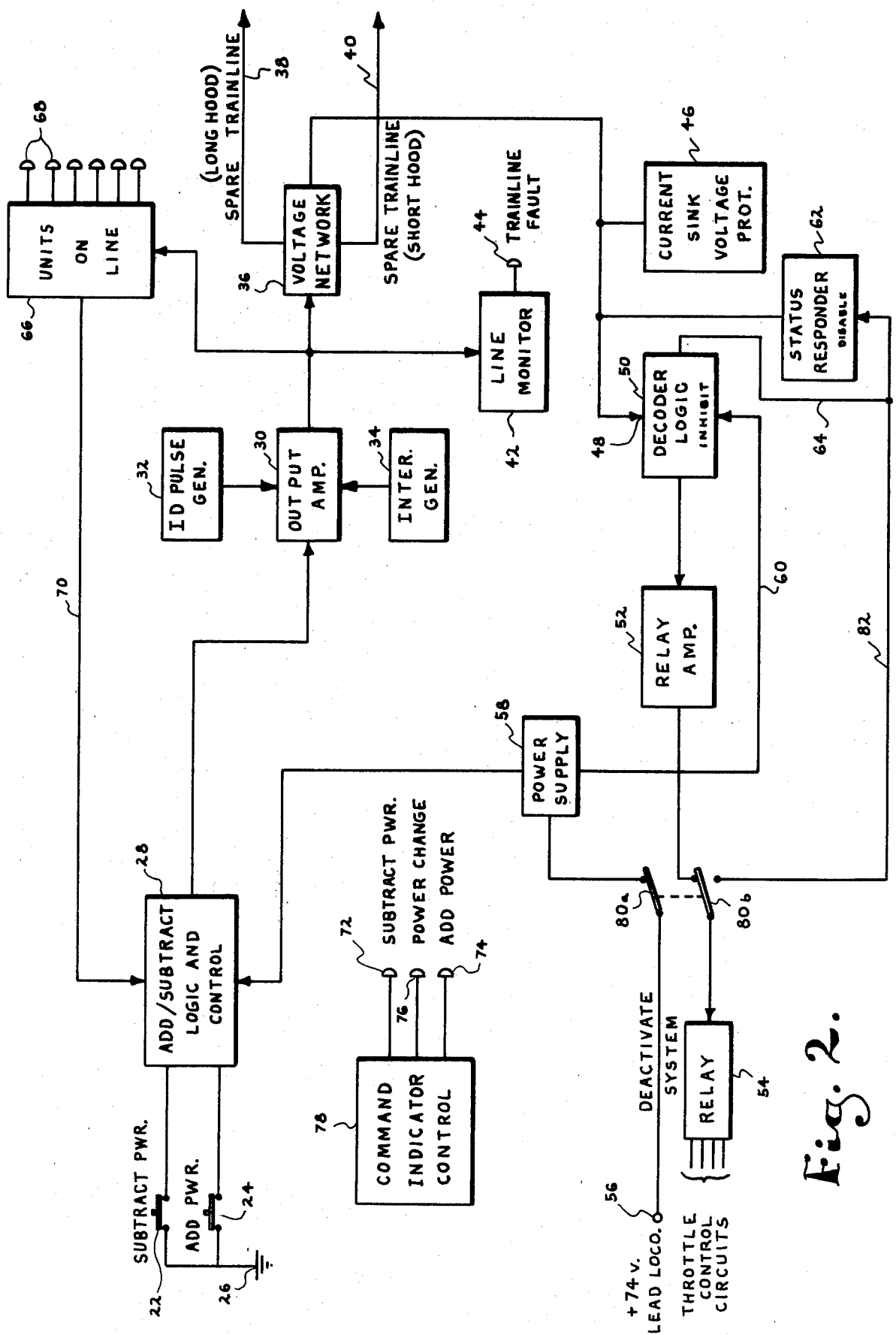
FIG. 2 is a block diagram of one of the identical control units used for either lead or trailing locomotives.

Referring to FIG. 2, a block diagram of one of the control units is shown. The installation of the control unit on a locomotive is the same regardless of whether the locomotive is in the lead or is one of the trailing locomotives of the consist. The subtract power and add power push buttons 22 and 24 are shown in association with their normally open switch contacts, such switches being connected in parallel between circuit ground at 26 and add/subtract logic and control circuitry broadly denoted 28. As will be discussed in detail hereinafter, the circuitry 28 controls certain voltage levels of a composite output signal delivered by an output amplifier 30, which also receives an identification pulse from an identification pulse generator 32 and an interrogation signal from an interrogation generator 34. The composite output signal from amplifier 30 is transmitted through a voltage network 36 to the other control units located in the trailing locomotives. Such trailing units are slave units responsive to the composite signal from output amplifier 30, such signal comprising a cutout control signal (also referred to hereinafter as simply the "control signal") which is periodically interrupted for transmission of the interrogation signal.

As is explained in our aforesaid copending application, a locomotive is customarily provided with a trainline connector at both its short hood end and its long hood end. A jumper cable is used to interconnect adjacent end connectors of a pair of tandem locomotives. In this manner, the trainline wires extend continuously from the lead locomotive to the last trailinng locomotive of the consist. The control system of the present invention requires one spare trainline wire interconnecting the various control units, an available electrical return being provided by a second trainline wire which is the negative supply lead of the conventional 74 volt DC power system. This single spare trainline is illustrated in FIG. 2 by the spare trainline wire 38 extending from the voltage network 36 to the long hood trainline connector, and the spare trainline wire 40 extending from the voltage network 36 to the short hood trainline connector. In the case of a lead locomotive with its short hood forward, no connection is made to the short hood trainline wire 40.

A line monitor 42 detects any defective conditions on the spare trainline. If the cutout control signal from amplifier 30 in the control unit of the lead locomotive is not within proper voltage parameters, the line monitor circuitry energizes a light emitting diode 44 seen from the front panel 20 of the unit (FIG. 1) to indicate a trainline fault.

The control signal from the voltage network 36 is applied to a circuit 46 containing a current sink and a voltage protection device, and is fed to the input 48 of a decoder 50 which, in turn, drives a relay amplifier 52 that controls a relay 54 in the throttle control circuits of the locomotive. In the control unit employed in the lead locomotive, the onboard electrical system supplies 74 volts DC to a power terminal 56 to which a power supply 58 is normally connected. The supply 58 furnishes the necessary operating voltages for those components of the control unit responsible for the generation and control of the cutout control signal, and the generation of the interrogation signal. Additionally, the power supply 58 operates power-on reset logic in the add/subtract logic and control 28 and, via line 60, applies a voltage to an "inhibit" input of the decoder 50. Accordingly, in the lead locomotive the decoder 50 is disabled but the remaining circuitry is operational. The throttle of the lead locomotive remains under the control of the engineer, and the cutout control signal is transmitted along the spare trainline 38 to the voltage network 36 of the control unit in the No. 1 trailing locomotive, and thence to the voltage networks 36 of the control units in the succeeding trailing locomotives. In each of the trailing locomotives the +74 volts is not available at terminal 56 so the decoder 50 is operational and, therefore, the engine throttle is under the command of the control unit in the lead locomotive.

The voltage network 36 also receives the periodically recurring interrogation signal. If the control unit is in a locomotive that is on line, status responder circuitry 62 senses the interrogation signal and reports the on-line status of the locomotive by causing a current pulse to appear on the spare trainline. If the locomotive has been previously cut out, the status responder circuitry 62 will be in a disabled condition as illustrated by a line 64 extending from the decoder 50 to a "disable" input of the responder, and no pulse will result from the interrogation.

The composite status report from the locomotives is processed by counting and readout circuitry 66 in order to display the number of units on line by energizing one or more of a series of six light-emitting diodes 68. Referring to FIG. 1, it may be seen that the six diodes 68 are arranged in a horizontal row beneath the legend "units on line." The numbers 1 through 6 on the panel beneath the respective diodes correspond to a system capacity of six locomotives. The number "1" corresponds to the lead locomotive, and the numbers "2" through "6" correspond to the first through the fifth trailing locomotives. The circuitry 66 also produces a voltage change on a reset line 70 each time the status changes by either the subtraction or addition of one locomotive. The reset line 70 extends to the add/subtract logic and control circuitry 28, and a voltage change thereon causes the circuitry 28 to cease the execution of the subtract or add power command.

Referring to FIG. 1, three additional light-emitting diodes are visible from the front panel 20 and are employed to further advise the engineer of the status of the system. A "subtract power" light 72 beneath the push button 22 remains on until all of the trailing locomotives are cut out, and is then extinguished to indicate that no additional power can be subtracted. Similarly, an "add power" light 74 beneath push button 24 remains on to show the availability of additional power until such time that all of the locomotives of the consist are on line. A "power change" light 76 is energized only during the interval required for the execution of a subtract or add power command (approximately two seconds). Preferably, the "subtract power" light 72, "train line fault" light 44, and "units on line" lights 68 are red, the "power change" light 76 is yellow, and the "add power" light 74 is green. In FIG. 2 a command indicator control 78 is illustrated and comprises logic circuitry responsive to the status of the system for appropriately controlling the energization of the lights 72, 74 and 76.

A run-isolate switch 80 is shown in FIG. 1 accessible from the front panel 20 of the control unit, and may be opened (thrown to the "isolate" position) to completely deactivate the control system if desired. The switch 80 has a pair of poles 80a and 80b illustrated in FIG. 2 in the "run" position where pole 80a connects the power supply 58 to power terminal 56 and pole 80b is in series with the line from the output of relay amplifier 52 to relay 54. In the isolate position, pole 80a is disengaged from its upper contact to open the power circuit to the power supply 58, and pole 80b engages its lower contact to disconnect the relay amplifier 52 and apply a voltage from relay 54 via a line 82 to the disable input of the status responder circuitry 62.

SUBTRACT AND ADD POWER COMMAND

Figure 3:
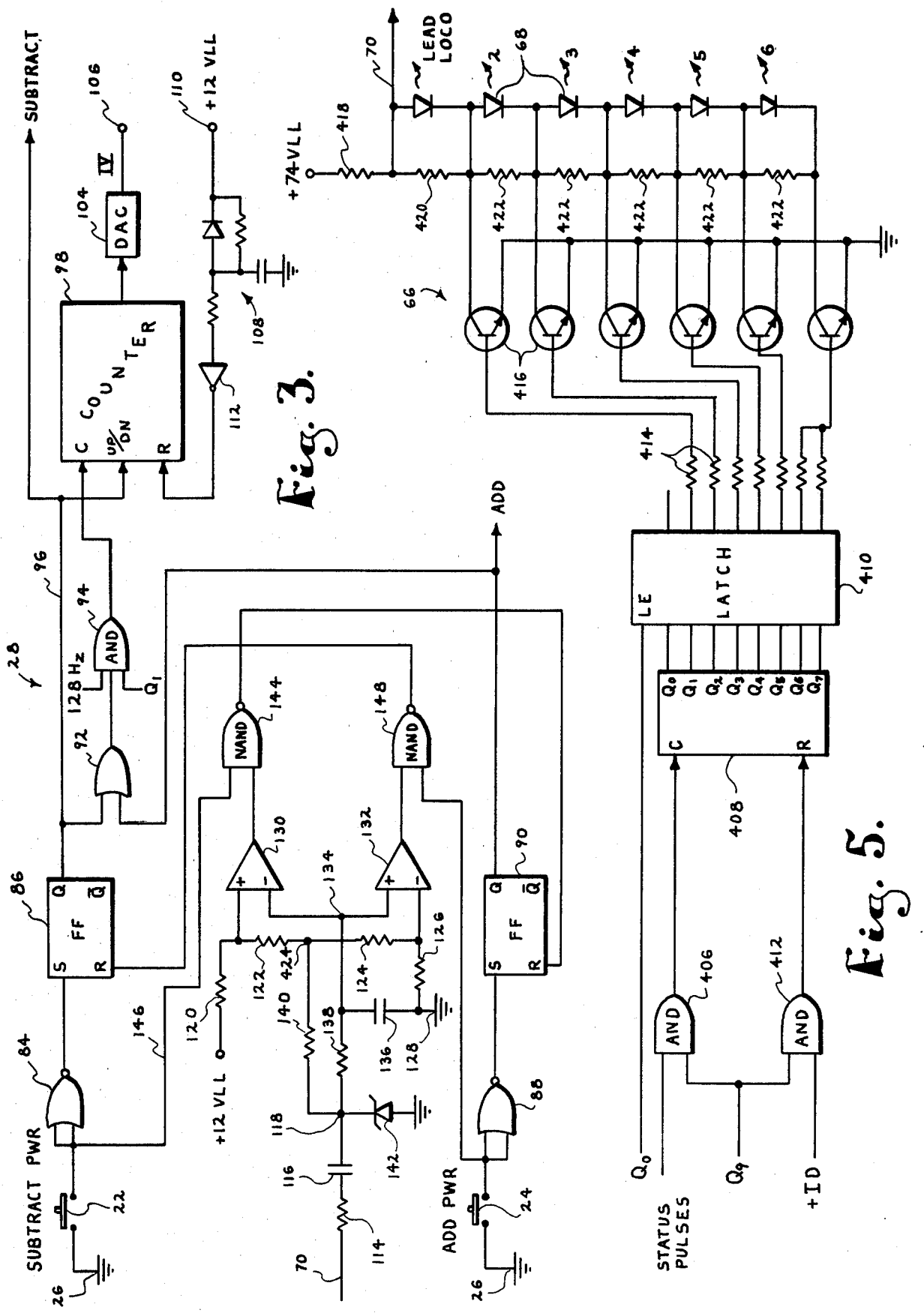
FIG. 3 is a logic diagram and simplified electrical schematic illustrating the add/subtract logic and control shown in the block diagram of FIG. 2.

FIG. 3 shows the add/subtract logic and control circuitry 28 in detail. A NOR gate 84 has its inputs tied together and serves as an inverter having an output that is normally at the low logic level and that is applied to the set input S of a flip-flop 86 of the set-reset type. The subtract power push button 22 has normally open switch contacts connected to the inputs of the NOR gate 84 and, as illustrated by the circuit ground 26, causes the output of the NOR gate 84 to go to the high logic level when the subtract power push button 22 is depressed and its contacts closed. This sets the flip-flop 86 and commands the system to subtract power.

Similarly, a NOR gate 88 has its inputs tied together and connected to the normally open contacts associated with the add power push button 24. The output of NOR gate 88 is normally at the low logic level and goes high when the add power push button 24 is depressed. This sets a flip-flop 90 of the set-reset type. The Q outputs of both flip-flops 86 and 90 are connected to the respective inputs of a two-input OR gate 92, the output thereof being connected to one of the inputs of a three-input AND gate 94. Additionally, the Q output of flip-flop 86 is connected via a lead 96 to the up/down control input of an up/down binary counter 98. When the high logic level is applied to the up/down input of counter 98, the counter counts up to execute a subtract command as will be subsequently explained; conversely, the low logic level at the up/down input causes the counter 98 to count down and execute an add power command.

Figure 4:
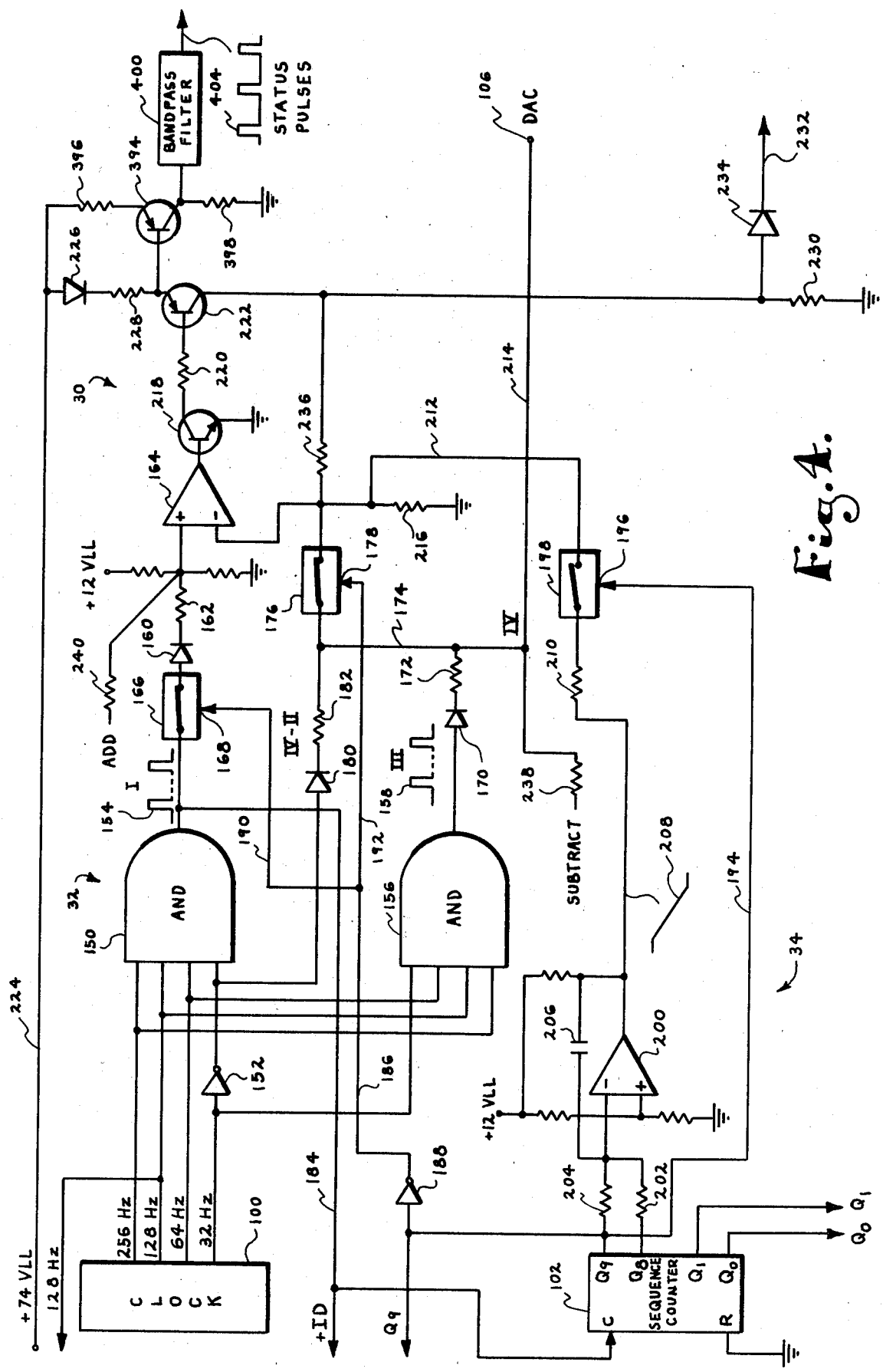
FIG. 4 is a logic diagram and simplified electrical schematic of the identification pulse generator, interrogation signal generator and output amplifier shown in the block diagram of FIG. 2.

Referring to FIG. 4, a clock generator 100 produces harmonically related clock pulses at the frequencies indicated, i.e., 32, 64, 128 and 256 Hz. A lead labeled "128 Hz" extends from the corresponding output of the clock 100 to one of the inputs of the AND gate 94 in FIG. 3. A decade sequence counter 102 (also in FIG. 4) has outputs $Q_0$ through $Q_9$, the $Q_0$, $Q_1$, $Q_8$ and $Q_9$ outputs being illustrated. A lead labeled $Q_1$ extends from the corresponding output of counter 102 to the third input of AND gate 94 in FIG. 3.

The counter 98 has a binary output that is converted to an analog value by a digital-to-analog converter (DAC) 104. As will be explained more fully under a subsequent heading in this specification, the output of the DAC 104 is presented at a terminal 106 and determines one of the voltage levels (level IV) of the cutout control signal.

Figure 10:
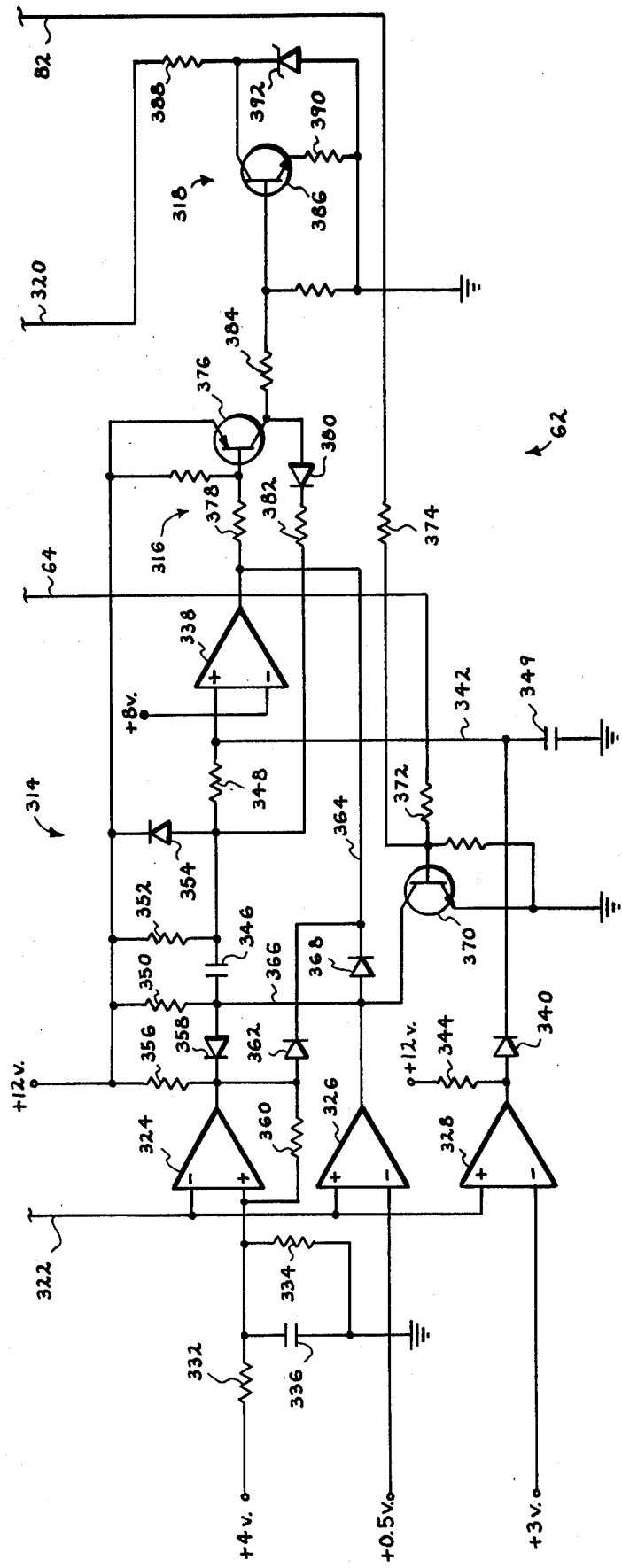
FIG. 10 is an electrical schematic diagram of the status responder shown in FIG. 2.

A power-on reset is provided for the counter 98 and is connected to its reset input R. A capacitor charging circuit 108 is connected to a positive 12 volt power terminal 110, and an inverter 112 is interposed between the circuit 108 and the reset input R. The terminal 110 is also identified "+12 VLL", the letters "LL" referring to the lead locomotive and indicating that power is available at this terminal only in the lead locomotive. This same identification is used on all power terminals shown in the drawings of this specification in those instances where power is supplied only in the lead locomotive, i.e., by power supply 58 shown in FIG. 2. (The power terminals in FIGS. 9 and 10 are not identified with the "LL" designation and, therefore, supply power whether in the lead locomotive or in a trailing locomotive.)

The flip-flop 86 or 90 is reset to cease execution of the subtract or add power command when the voltage level on reset line 70 undergoes a 2 volt change. Such change occurs when a locomotive is either subtracted from or added to the number of locomotives on line, as will be discussed in detail hereinbelow. The line 70 in FIG. 3 is connected to a resistor 114 in series with a capacitor 116, such RC combination forming a differentiator which presents either a positive or negative going pulse to a junction point 118. A voltage divider is provided by four resistors 120, 122, 124 and 126 which are connected in series from the positive 12 volt supply to circuit ground at 128. An operational amplifier 130 has its noninverting input connected between resistors 120 and 122, and an operational amplifier 132 has its inverting input connected between resistors 124 and 126 of the voltage divider arrangement. The inverting input of operational amplifier 130 and the noninverting input of operational amplifier 132 are interconnected at a junction point 134. A capacitor 136 is connected from junction point 134 to ground, a resistor 138 interconnects junction points 118 and 134, and a resistor 140 interconnects junction point 118 and a point on the voltage divider between resistors 122 and 124. A zener diode 142 is connected from junction point 118 to ground for voltage protection purposes.

Representative values for the components of the voltage divider and associated capacitor charge circuit are as follows:
Resistor 120—10,000 ohms
Resistor 122—750 ohms Resistor 124—750 ohms
Resistor 126—2,000 ohms
Capacitor 136—0.01 microfarad
Resistor 138—51,000 ohms
Resistor 140—51,000 ohms.

The output of operational amplifier 130 is connected to one input of a two-input NAND gate 144, the other input thereof being connected by a lead 146 to the inputs of the NOR gate inverter 84 associated with the subtract power push button 22. The output of NAND gate 144 is connected to the reset input R of flip-flop 90. Similarly, the output of operational amplifier 132 is connected to one input of a two-input NAND gate 148, the other input thereof being connected to the inputs of the inverting NOR gate 88 associated with the add power push button 24. The output of NAND gate 148 is connected to the reset input R of flip-flop 86.

IDENTIFICATION PULSE GENERATOR, INTERROGATION SIGNAL GENERATOR AND OUTPUT AMPLIFIER

Referring to FIG. 4, the identification pulse generator 32, interrogation signal generator 34, and output amplifier 30 are illustrated in detail. The four harmonically related outputs of the clock 100 are delivered to respective inputs of a four-input AND gate 150. It should be noted that the 32 Hz clock pulses are inverted by an inverter 152 ahead of the AND gate input. The AND gate 150 decodes the input clock pulses and functions as a one-out-of-sixteen decoder, with the result that the output of the AND gate 150 goes to the high logic level for 2 milliseconds out of every 32 milliseconds. This is illustrated in FIG. 4 by the successive pulses 154 from the output of AND gate 150. These output pulses 154 cause each repetition of the cutout control signal (FIG. 6, third wave form diagram) to have an initial, high voltage level I which provides an identifier pulse.

A four input AND gate 156 also receives the 32, 64, 128 and 256 Hz clock pulses but the 32 Hz clock is not inverted. Accordingly, AND gate 156 functions the same as AND gate 150 except that the 2 millisecond output pulses 158 thereof are displaced 16 milliseconds in time as compared with the output pulses 154 from AND gate 150. The output pulses 158 from AND gate 156 cause each repetition of the cutout control signal (FIG. 6) to assume a minimum voltage level designated III.

The output of AND gate 150 is connected by a series diode 160 and resistor 162 to the noninverting input of an operational amplifier 164. However, a field effect transistor (FET) switch 166 is interposed in the output of AND gate 150 ahead of the diode 160. The FET switch 166 has a control input 168 and, when a positive voltage is maintained on input 168, the FET switch 166 is closed as illustrated.

The output of AND gate 156 is connected by a series diode 170 and resistor 172 to a lead 174 that extends to an FET switch 176 which is interposed in series between the lead 174 and the inverting input of operational amplifier 164. The FET switch 176 has a control input 178 and is closed as shown as long as a positive voltage is maintained on input 178. The inverted 32 Hz clock pulses are also fed to the inverting input of amplifier 164 through the FET switch 176 by a series connected diode 180 and resistor 182 that connect with lead 174. The resistor 182 has an ohmic value selected to establish a 10 volt difference between voltage level IV and voltage level II of the cutout control signal wave form (FIG. 6).

A lead 184 extends from the output of AND gate 150 to the clock input C of the sequence counter 102. A lead 186 (which has an inverter 188 interposed therein) extends from the $Q_9$ output of counter 102 to branch leads 190 and 192 that are connected to the control inputs 168 and 178 respectively of FET switches 166 and 176. Additionally, a lead 194 (without inversion) extends from the $Q_9$ output of counter 102 to the control input 196 of a FET switch 198 shown in FIG. 4 in the open condition (positive voltage not applied to input 196).

An operational amplifier 200 functions as an integrator and has its inverting input connected to the $Q_8$ and $Q_9$ outputs of counter 102 by resistors 202 and 204 respectively. A capacitor 206 is connected from the output of amplifier 200 back to the inverting input thereof, and the time constant of capacitor 206 and resistor 204 determines the slope of a ramp voltage produced at the output of amplifier 200 and illustrated at 208. The output of amplifier 200 is coupled by a resistor 210 to the FET switch 198 which, upon closure thereof, connects the output of amplifier 200 to the inverting input of amplifier 164 via a lead 212.

A lead 214 extends from the DAC terminal 106 in FIG. 4 to lead 174; accordingly, when FET switch 176 is closed, the digital-to-analog converter 104 (FIG. 3) is directly connected to the inverting input of amplifier 164 (FIG. 4). The DAC 104 may comprise a bank of resistors connected to the respective binary outputs of the counter 98 and, in such case, would serve as a variable current source across a resistor 216 connected from the inverting input of amplifier 164 to circuit ground. This would provide a voltage level at such inverting input that corresponds to the count contained in counter 98. As represented by the designation IV in FIGS. 3, 4, 6 and 8, the DAC 104 establishes voltage level IV of the wave form of the cutout control signal.

An NPN transistor 218 has its emitter grounded and its base connected to the output of amplifier 164. A resistor 220 connects the collector of transistor 218 to the base of a PNP transistor 222. Transistors 218 and 222 function as a voltage level converter, it being noted that the emitter of transistor 222 is connected to a +74 volt power lead 224 by a series connected diode 226 and resistor 228. The collector of transistor 222 delivers the output of the amplifier circuit across a load resistor 230, such output being the cutout control signal. The control signal is fed to the voltage network 36 (FIG. 2) along an output lead 232 in which an isolation diode 234 is interposed. A feedback resistor 236 is connected from the collector of transistor 222 back to the inverting input of amplifier 164.

It should also be noted that leads designated SUBTRACT and ADD in FIG. 3 extend to the circuitry of FIG. 4. The SUBTRACT lead is an extension of lead 96 from the Q output of flip-flop 86 and is connected in FIG. 4 by a resistor 238 to the lead 214 from the DAC terminal 106. The ADD lead is from the Q output of flip-flop 90 in FIG. 3 and is connected by a resistor 240 to the noninverting input of amplifier 164 in FIG. 4. The purpose of the SUBTRACT and ADD leads will be subsequently explained.

THE CONTROL SIGNAL VOLTAGE DROP FROM UNIT TO UNIT

FIG. 7 illustrates the manner in which the control units in the respective trailing locomotives are connected in series by the spare trainline. It may be appreciated that the cutout control signal generated in the lead locomotive is transmitted to the voltage network 36 of the control unit in the No. 1 trailing locomotive via the spare trainline 40 from the No. 1 trailing locomotive's short hood trainline connector, assuming that the short hood is forward. The control signal is transmitted on from such voltage network by the spare trainline 38 that extends to the long hood trainline connector, and thence by a trainline jumper cable to the adjacent trainline connector of the No. 2 trailing locomotive. The control signal is conducted through the voltage network 36 of the control unit in the No. 2 trailing locomotive, and then on via the spare trainline to the voltage network 36 of the control unit in the No. 3 locomotive, etc. to the end of the consist. Accordingly, the spare trainline provides a transmission line for the control signal that extends from the control unit in the lead locomotive to the control units in the trailing locomotives in serial order.

FIG. 8 illustrates the action of the voltage networks 36 as the control signal is transmitted down the trainline. The lead locomotive is at the left, and the control unit therein produces the cutout control signal that appears on output lead 232. The lead 232 extends to a junction point 242 to which two zener diodes 244 and 246 are connected in back-to-back relationship (anodes connected to junction point 242). Diode 244 is connected to the trainline wire that extends from the short hood trainline connector, and thus is effectively out of the circuit in the lead locomotive control unit. A series connected resistor 248 and a 75 volt zener diode 250 are connected from the junction point 242 to circuit ground. With its anode at circuit ground (negative supply), the zener diode 250 protects the circuitry against transients on the trainline having a voltage greater than the +74 volt supply potential. Therefore, diode 250 is normally nonconductive, and a relatively small, constant current (typically 6 ma.) normally flows through a current sink 252 connected in parallel with the diode 250. The current sink allows operation of the control unit with up to 5 ma. of leakage to the positive supply. Since the decoder 50 is disabled in the control unit of the lead locomotive, the cutout control signal is simply transmitted on to the No. 1 trailing locomotive via diode 246 and the interconnecting trainline TL. A wave form 254 beneath the circuit diagram shows the cutout control signal as it would appear unmodified at the condition in which the Nos. 1, 2, 3 and 4 trailing locomotives are on line, and the No. 5 trailing locomotive is throttled back to notch 1.

In the No. 1 trailing locomotive, the control signal flows to the junction point 242 but encounters the zener diode 244 which, as illustrated by the wave form 256, induces a 6 volt drop in the control signal. The control signal is conducted from such junction point 242 by the diode 246 and trainline TL to the control unit in the No. 2 trailing locomotive, where the control signal again undergoes a 6 volt drop by the action of the zener diode 244. The wave form 258 illustrates the control signal as it now appears at junction point 242 in the voltage network 36 of the control unit in the No. 2 trailing locomotive. This 6 volt drop from unit to unit continues down the line, the resultant wave form at junction point 242 in the control unit of the last, No. 5 trailing locomotive being illustrated at 260.

CONTROL SIGNAL DECODER

Referring to FIG. 9, the decoder 50 employs four voltage comparators 262, 264, 266 and 268 and associated circuitry to recognize the identifier pulse portion of the cutout control signal (level I) and detect the control levels II and IV thereof (see FIG. 6, third wave form diagram). Each of the voltage comparators is an integrated circuit component which either presents an open circuit at its output (when the voltage at its noninverting input is greater than the voltage at its inverting input) or switches its output to circuit ground (when the voltage at its inverting input is greater than the voltage at its noninverting input).

The voltage comparator 262 serves as a threshold detector, a bias voltage at its inverting input being established by voltage divider resistors 270 and 272. The supply voltages to the various components are as indicated by the legends accompanying the respective supply terminals.

The cutout control signal is fed to the inverting input of comparator 262 by input resistor 274. The noninverting input thereof is maintained at 3 volts as indicated. Resistor 270 is very large as compared with resistor 272 (typically 20 times the ohmic value of resistor 272), and the value of input resistor 274 is selected such that a threshold of approximately 21 volts is defined. Accordingly, whenever level I of the identifier pulse is over 21 volts, the output of comparator 262 goes to ground for the 2 msec. period.

The output of comparator 262 is connected by a resistor 276 to the inverting input of comparator 264, and a capacitor 278 extends from such inverting input to ground. A resistor 280, typically 40 times the ohmic value of resistor 276, is connected from the 12 volt supply to the output of comparator 262. The noninverting input of comparator 264 is maintained at +8 volts. Accordingly, when the output of comparator 262 goes to ground in response to the identifier pulse, capacitor 278 discharges relatively rapidly through resistor 276. After the 2 msec. identifier pulse, the capacitor 278 is permitted to recharge at a much slower rate via resistor 280. The result is that the voltage across capacitor 278 is maintained at a relatively low level as compared with the 8 volts on the noninverting input of comparator 264, due to the repetitive discharging thereof through resistor 276. However, if the identifier pulse is lost (signifying that a valid control signal is not on the trainline wire) the capacitor 278 is permitted to charge to 12 volts and this forces the output of comparator 264 to ground.

The effect of the loss of the identifier pulse, insofar as the decoder 50 is concerned, is the same as the inhibit function executed by line 60. It will be recalled that in the lead locomotive a positive voltage is present on line 60, but is not applied to line 60 when the control unit is in a trailing locomotive. The presence of the positive supply voltage on line 60 in the lead locomotive causes an NPN transistor 282 to conduct, thereby grounding the output of comparator 264 via a lead 284. Therefore, either the inhibit function or failure of identifier pulses to be recognized by the trailing locomotive control units effectively short-circuits junction point 286 (at the output of comparator 264) to ground. With point 286 at ground, the relay 54 cannot be energized to cut off (throttle back) the locomotive.

To now illustrate normal system operation in which one locomotive at a time is either subtracted from or added to the number of locomotives on line, it will be initially assumed that junction point 286 is not grounded and that the output of comparator 264 is an open circuit. Therefore, the comparator 266 is permitted to operate and performs a gating function by sensing levels II and IV of each incoming control signal. A resistor 288 connects the decoder input 48 to the inverting input of comparator 248, and a resistor 290 is connected from such inverting input to ground. The noninverting input is maintained at +0.5 volts. When both levels II and IV are at 6 volts or greater (as is the case, for example, for the lead and first and second trailing locomotives in FIG. 8 as shown by the wave forms 254, 256 and 258), then the output of comparator 266 is forced to ground. When both levels II and IV are below 6 volts (No. 5 trailing locomotive in FIG. 8 as shown by wave form 260), the output of comparator 266 is an open circuit 100 percent of the time. In the intermediate conditions where level IV is at 6 volts or above but level II is not (which although not shown is the case in FIG. 8 for the No. 3 and No. 4 trailing locomotives), a square wave output from comparator 266 results, the effect of which will be explained below.

A resistor 292 is connected from the 12 volt supply to junction point 286, two series resistors 294 and 296 connect point 286 to the noninverting input of comparator 268, and a capacitor 300 is connected from the common ends of these two resistors to ground. A resistor 302 is connected from an essentially 12 volt supply lead 304 to the noninverting input of comparator 268. It is instructive to note representative relative sizes of these four resistors, as follows:

Resistor 292—10,000 ohms
Resistor 294—200,000 ohms
Resistor 296—20,000 ohms
Resistor 302—390,000 ohms.

The output of comparator 268 drives an operational amplifier 306 which, in turn, operates an NPN transistor switch 308. When transistor 308 is in conduction, its emitter-collector circuit provides a ground connection for the relay 54 and energizes the relay to cut out the locomotive.

Assuming normal operation of the system with both voltage levels II and IV of the control signal below 6 volts, the output of comparator 266 is open and there is nothing to discharge capacitor 300. Therefore, capacitor 300 continues to charge with the result that the output of comparator 268 is driven to +12 volts. The output of comparator 268 and the noninverting input of operational amplifier 306 are interconnected, and are connected to the power lead 304 by a lead 310. The series resistor 312 in power lead 304 is relatively small, such as 5000 ohms. Accordingly, the transistor switch 308 is turned on and the relay 54 is energized to throttle back the locomotive.

In response to an add power command, voltage levels II and IV of the control signal progressively increase. Therefore, during the execution of an add power command, there will be a transitory condition in which level IV of the control signal reaches and exceeds 6 volts but level II still is less than 6 volts. At this time the output of comparator 266 becomes a square wave but relay 54 remains energized. This is because of the operational characteristic imparted to the system by levels II and IV and the relatively large resistors 294 and 302. The capacitor 300 (typically approximately 5 uf.) cannot discharge sufficiently to change the state of the comparator 268 until such time that both levels II and IV of the control signal reach or exceed 6 volts and junction point 286 is shorted to ground 100 percent of the time. Once this occurs in response to the add power command, the capacitor 300 discharges and the voltage on the noninverting input of comparator 268 falls below the 6 volts applied to the inverting input thereof, thereby switching the output of comparator 268 to ground and removing the drive from the operational amplifier 306 (which has 6 volts standing on its inverting input). Accordingly, the transistor switch 308 opens and the relay 54 drops out to return the locomotive on line.

The same transitory condition is also present during execution of a subtract power command when levels II and IV of the control signal are progressively decreasing, in which case the capacitor 300 will not charge sufficiently to overcome the 6 volts standing on the inverting input of comparator 268 until both levels II and IV are below 6 volts and, therefore, 12 volts is available at junction point 286 100 percent of the time. This operational characteristic in the manual system disclosed herein imparts hysteresis to the automatic speed control system of our aforesaid copending application, as disclosed therein. Accordingly, the manual power selection system of the present invention is fully compatible with the automatic system in that the control units of the present invention, in trailing locomotives, will respond to the cutout control signal from the control unit in the lead locomotive irrespective of whether such signal is transmitted from a manual system control unit as disclosed herein or an automatic system control unit as disclosed in said application. (Changes in the manual system as compared with the automatic system that should be noted, but which do not affect compatibility, are the doubling of the repetition rate of the control signal in the manual system and the reduction of the voltage difference between levels II and IV to 10 volts for the purpose of increasing system response so that add or subtract power commands will be executed and completed in approximately two seconds.)

STATUS REPORT AND UNITS-ON-LINE DISPLAY

Referring initially to FIG. 7, the status responder 62 in each of the control includes status report logic circuitry 314 responsive to the periodic interrogation signals on the trainline. If the locomotive is on line, the circuitry 314 triggers a one shot 316 which, in turn, places a 40 ma. current sink 318 on the trainline for a period of approximately 600 microseconds. The logic circuitry 314 is disabled by the decoder 50 via line 64 if the locomotive is cut out, so one shot 316 does not fire. As will be explained more fully hereinbelow, the 6 volt drop from unit to unit causes the current pulses from the current sinks 318 of control units in on-line trailing locomotives to be time spaced so that they occur sequentially and may be counted in the control unit of the lead locomotive.

FIG. 10 shows the status responder 62 in detail. It may be noted that lines 64 and 82 extend from the decoder circuitry of FIG. 9 to the responder circuitry of FIG. 10. Additionally, a lead 320 extends from junction point 242 in FIG. 9 to the current sink 318 in FIG. 10, and a lead 322 extends from the inverting input of comparator 266 to three voltage comparators 324, 326 and 328 in FIG. 10 (specifically, to the inverting input of comparator 324 and the respective noninverting inputs of comparators 326 and 328).

Before proceeding with a detailed description of the circuitry of FIG. 10, it is instructive to refer to the third and fourth wave form diagrams in FIG. 6. The third wave form diagram in FIG. 6 shows two complete repetitions of the cutout control signal and the beginning of a third, preceded by the interrogation signal which comprises a voltage ramp 330. As will be discussed, the voltage ramp 330 appears once in every ten periods, each of 32 milliseconds duration as determined by the clock 100 (FIG. 4). In this diagram the cutout signal is seen as it would typically appear on output lead 232 of the control unit in the lead locomotive in the control condition in which the fifth trailing locomotive is cut out (the condition as represented in FIG. 8). It should be appreciated that the 6 volt drop from unit to unit affects the voltage ramp 330 as well as the cut-out control signal so that at the fifth trailing locomotive, for example, 15 volts at junction point 242 of its control unit would require 45 volts at the ramp 330 as transmitted from the control unit in the lead locomotive.

Referring again to FIG. 10, 15 volts at junction point 242 (FIG. 9) is the threshold at which the status responder 62 will produce a current pulse if the locomotive is on line and if other conditions are also met. The on-line or off-line condition is sensed via line 64 since it is connected to the output of comparator 288 in FIG. 9. It will be recalled that when the output of comparator 268 is at ground the relay 54 is deenergized and the locomotive, therefore, is on line. Conversely, if the output of comparator 268 is at +12 volts, the relay 54 is energized and the locomotive is cut out. The lead 320 from the current sink 318 carries the output of the responder 62 and the current pulse appears thereon if the locomotive is on line; if the locomotive is off line, no pulse is produced.

The reference voltage for comparator 324 is established by a voltage divider comprising series resistors 332 and 334, resistor 332 being connected from a +4 volt supply terminal to the noninverting input of comparator 324 and resistor 334 being connected from such input to circuit ground. A capacitor 336 (typically 0.1 microfarad) is connected from the noninverting input of comparator 324 to ground to prevent activation of comparator 324 on transients. The inverting input of comparator 326 is maintained at a +0.5 volt reference. Accordingly, high and low reference levels are established for the comparators 324 and 326 respectively, such that the comparator 324 switched to ground at its output when 15 volts is reached at junction point 242 (FIG. 9). The output of comparator 326 is normally at ground and is switched to the open circuit condition when the voltage level at junction point 242 reaches 6 volts. The effect of the two comparators is to provide a window from 6 to 15 volts to sense the presence of the relatively slowly increasing voltage ramp 330 of the interrogation signal to arm the responder 62. However, no on-line response is made until the voltage at junction point 242 established by the voltage ramp 330 passes through this 6 to 15 volt window.

The comparator 328 has +3 volts standing on its inverting input and its output is, therefore, normally at ground. Comparator 328 functions as an identification pulse override in that, in response to the identification pulse (level I of the cutout control signal) or any voltage over 21 volts at junction point 242, its output goes to the open circuit condition. A voltage comparator 338 has +8 volts standing on its inverting input, and a diode 340 and lead 342 connect the output of comparator 328 with the noninverting input of comparator 338. A resistor 344 connects the output of comparator 328 to the +12 volt supply.

The noninverting input of comparator 338 is normally at +12 volts. With +8 volts standing on its inverting input, the noninverting input must be driven to less than 8 volts in order for comparator 338 to trip, at which time its output goes from an open circuit condition to ground. This triggers the one shot 316. The comparator 328 is provided as an override as mentioned above to prevent the tripping of comparator 338 when the interrogation pulse is received at the beginning of each cutout control signal. A voltage at junction point 242 greater than 21 volts causes the output of comparator 328 to go to the open circuit condition which, via resistor 344, holds the noninverting input of comparator 338 significantly above 8 volts so that it cannot be tripped.

A capacitor 346 has its righthand plate (as viewed in FIG. 10) connected to the noninverting input of comparator 338 by a resistor 348, and its lefthand plate connected to the +12 volt supply by a resistor 350 which provides a discharge path. A resistor 352 is connected from the right plate of capacitor 346 to the +12 volt supply, and a diode 354 is connected in parallel with resistor 352 and poled with its cathode connected to the +12 volt supply. A filter is formed by the resistor 348 (51,000 ohms) and a capacitor 349 (0.01 uf.) that is connected via lead 342 from the noninverting input of comparator 338 to ground.

A resistor 356 is connected from the +12 volt supply to the output of comparator 324, and a diode 358 has its cathode connected to such output and its anode connected to the left plate of capacitor 346. A resistor 360 is connected from the output of comparator 324 back to the noninverting input thereof, and a diode 362 has its anode connected to such output and its cathode connected to a lead 364 that extends to the output of comparator 338.

The output of comparator 326 is connected to the left plate of capacitor 346 by a lead 366, and is connected to lead 364 by a diode 368 poled with its anode connected to the comparator output. The output of comparator 326 is also connected to the collector of an NPN transistor 370 which, when in conduction, clamps capacitor 346 to ground. The base of transistor 370 presents the "disable" input of the status responder 62 illustrated in FIG. 2, to which lines 64 and 82 are connected by resistors 372 and 374 respectively.

The one shot 316 includes a PNP transistor 376, the base of which is connected by a resistor 378 to the output of comparator 338. A series-connected diode 380 and resistor 382 extend from the collector of transistor 376 back to the right plate of capacitor 346 in order to effectively place resistor 382 in parallel with resistor 352 when transistor 376 is conducting. This controls the width of the single shot output. Typically, resistor 282 is 8200 ohms whereas resistor 352 is 51,000 ohms.

The collector of transistor 376 is connected by a resistor 384 to the base of an NPN transistor 386 in the current sink circuitry 318. Lead 320 is connected to the collector of transistor 386 by a resistor 388, and the emitter thereof is connected to circuit ground by a resistor 390. The combined resistance of resistors 388 and 390 is approximately 350 ohms; accordingly, with the voltage on the trainline at 15 volts, conduction of transistor 386 places this resistance from such trainline (junction point 242 in FIG. 9) to ground to place a momentary load on the trainline of approximately 40 milliamperes. A 75 volt zener diode 392 for voltage protection is connected from the collector of transistor 386 to ground.

Representative values of certain components of the status responder 62 not mentioned above are as follows:
Capacitor 346—0.047 microfarad
Resistor 350—10,000 ohms
Resistor 356—20,000 ohms
Resistor 360—115,000 ohms.

Referring to FIG. 4, a PNP transistor 394 functions as a current-to-voltage converter and has its base connected to the emitter of transistor 222. The emitter of transistor 394 is connected by a resistor 396 to the +74 volt power lead 224, and a resistor 398 connects the collector of transistor 394 to ground. The diode 226 in series with the emitter of transistor 222 prebiases the subsequent transistor 394 so that it is near conduction. The voltage drop across diode 226 for a silicon diode is about 0.6 volts, and the series resistor 228 is small (on the order of 20 ohms). Accordingly, when the momentary 40 ma. load is added to the trainline during a status report, the transistor 394 conducts. A bandpass filter 400 has its input connected to the collector of transistor 394 and is tuned to pass pulses of the approximate width of the voltage pulses produced by the momentary 40 ma. current load, thereby rejecting lower and higher frequencies in order to exclude unwanted components and noise. In FIG. 6, the fourth wave form diagram shows the voltage at the collector of transistor 394 (input of bandpass filter 400) and illustrates five voltage pulses 402 prior to conditioning by the bandpass filter 400. The width of each pulse 402 is 600 to 700 microseconds, and the spacing is approximately 2 milliseconds. The output of the filter 400 is illustrated in FIG. 4 by the status pulses 404.

Referring to FIG. 5, it may be seen that the status pulses from bandpass filter 400 in FIG. 4 are applied to one input of a two-input AND gate 406, the output thereof being connected to the clock input C of a counter 408. The $Q_0$, $Q_9$ and +ID connections from FIG. 4 are also carried over to FIG. 5 as shown, the $Q_0$ output of sequence counter 102 being connected to the latch enable (LE) input of a latch 410. The $Q_9$ output from sequence counter 102 is connected to the other input of AND gate 406 and to one input of a two-input AND gate 412. The other input of AND gate 412 is connected to the +ID line which is a branch of lead 184 in FIG. 4.

Eight outputs $Q_0$ through $Q_7$ of the counter 408 are illustrated and are connected to corresponding inputs of the latch 410. The latch output corresponding to the $Q_0$ output of counter 408 is not used. The latch outputs corresponding to outputs $Q_1$ through $Q_7$ of counter 408 are connected by respective base drive resistors 414 to the corresponding bases of six NPN switching transistors 416 (with the exception that the last two resistors 414 corresponding to the $Q_6$ and $Q_7$ counter outputs are connected in parallel to the base of the lowermost transistor 416 of the series). As will be seen, each of the transistors 416 controls the energization of a corresponding light-emitting diode 68 of the units-on-line display shown in FIG. 1.

A resistor 418 is connected from the $\rightleftarrows$74 volt supply to the reset line 70. A resistor 420 and the first LED 68 are connected in parallel from line 70 to the collector of the first transistor 416. Similarly, each of the remaining LED's 68 and a corresponding resistor 422 are connected in parallel from the collector of one transistor 416 to the next. Each of the resistors 420 and 422 is typically 1000 ohms. The result is that the voltage on reset line 70 changes by approximately 2 volts each time one of the LED's 68 is either energized or deenergized. The resistors 420 and 422 serve only to allow operation in case of an LED failure.

OPERATION

The considerations set forth in our aforesaid copending application with respect to the most efficient throttle position of a particular type of locomotive are applicable to the present invention and are incorporated herein by reference. For example, in the case of those turbocharged diesel engines where the maximum throttle position (notch 8) is the most efficient setting, this fact is known to the engineer. (Notch 7 is most efficient on some models). Therefore, in order to obtain the maximum fuel savings with the manually operated system disclosed herein, the engineer would first bring the throttle of the lead locomotive out to the eighth notch. The trailing locomotives follow this setting and, accordingly, all of the locomotives of the consist are operating at maximum power and maximum efficiency. For the purposes of the discussion to follow, it is assumed that this is the initial condition of the consist prior to utilization of the power selection system of the present invention.

The control units in the respective locomotives remain connected to the onboard power source at all times. Therefore, the control unit in the lead locomotive commences the transmission of the cutout control signal immediately upon operation of the locomotive. Power-on resets in the add/subtract logic and control circuitry 28 of FIG. 3 are employed to assure that the output of the control unit of the lead locomotive at output lead 232 (FIGS. 4 and 8) at turn-on is such that all locomotives will remain on line and follow the throttle of the lead locomotive in the conventional fashion. Such output at turn-on is illustrated in the second wave form diagram of FIG. 6 where it may be seen that the output transistor 222 is saturated during each repetition of the control signal from the time of the interrogation pulse until the 2 millisecond period of level III. Voltage level II at this time is just below saturation.

A power-on reset is illustrated in FIG. 3 for the counter 98. At turn-on, +12 volts becomes available at power terminal 110 but this voltage cannot be applied to the input of inverter 112 until the capacitor in circuit 108 charges. Therefore, the output of inverter 112 is momentarily at the high logic level to reset the counter 98. Once the capacitor in circuit 108 charges, the reset is removed and the counter 98 may receive a subtract power command if the engineer elects to reduce power. It should be understood that when counter 98 is reset, it is at a count of zero and thus the DAC 104 does not drive the inverting input of the operational amplifier 164 (FIG. 4); therefore, the output transistor 222 is driven to saturation.

When the engineer desires to reduce power, he depresses the subtract power push button 22 to set the flip-flop 86 in FIG. 3. With the Q output of flip-flop 86 now at the high logic level, the following occur:

1. The SUBTRACT lead goes high to instantly place a current source in parallel with the source provided by the DAC 104 thereby providing an instantaneous change in the output of operational amplifier 164. This change may, for example, be such as to cause a 5 volt instant decrease in the voltage at the collector of output transistor 222.

2. The up/down input of counter 98 goes high to condition the counter to count up.

3. The output of OR gate 92 goes high and thus the corresponding input of AND gate 94 goes high. Therefore, the AND gate 94 will deliver pulses to the clock input C of counter 98 when both the $Q_1$ output of sequence counter 102 is high and clock pulses from the 128 Hz output of clock 100 are received. Accordingly, the counter 98 begins to count up which causes excitation to the inverting input of operational amplifier 164 to increase, thereby decreasing the output of transistor 222 to effect a progressive decrease in voltage levels II and IV of the control signal. This continues until both levels II and IV at the No. 5 trailing locomotive fall below 6 volts at the junction point 242 of that control unit. When this occurs, as described under the previous heading "Control Signal Decoder," the relay 54 in that unit is energized to reduce the throttle setting to notch 1.

At this juncture it is instructive to note that the sequence counter 102 is clocked by the identification pulses 154 from the output of AND gate 150 (FIG. 4). Accordingly, levels II and IV of the control signal will only be subject to change during one period (the $Q_1$ interval) out of every ten of the 32 millisecond periods defined by the clock 100 and the AND gate 150. This is because the AND gate 94 in FIG. 3 ahead of the clock input C of counter 98 has one of its inputs connected to the $Q_1$ output of sequence counter 102, as previously described. During another of these intervals (the $Q_9$ interval), the control signal is interrupted and the interrogation signal (voltage ramp 330) is transmitted to the control units in the trailing locomotives. This timing is illustrated in the first wave form diagram of FIG. 6 where the voltage level at the $Q_9$ output of counter 102 is shown plotted against the ten time intervals $Q_9$, $Q_0$, $Q_1$, and $Q_2$ through $Q_8$.

Returning for a moment to the condition prior to the cutout of the No. 5 trailing locomotive, it will be appreciated that during each $Q_9$ time interval the interrogation signal was transmitted down the trainline and the lead locomotive and all five trailing locomotives responded with a status report showing that all six of the locomotives were on line. During the $Q_9$ interval, as the junction point 242 in each control unit reached the 15 volt level, the one shot 316 (FIGS. 7 and 10) fired and the current sink 318 momentarily loaded the trainline with a current pulse. (The locomotives respond sequentially due to the voltage ramp 330 and the 6 volt drop from control unit to control unit). Details of the operation of the status responder 62 of each control unit will be discussed hereinbelow, it being sufficient at this juncture to understand that the status pulses 404 (FIG. 4) produced in the control unit of the lead locomotive in response to these current pulses are counted by the counter 408 in FIG. 5 to cause the energization of all six of the LED's 68.

More particularly, when the $Q_9$ output of sequence counter 102 goes high at the beginning of the $Q_9$ time period, the counter 408 is reset by AND gate 412 since an identification pulse 154 is simultaneously received by AND gate 412 at this time. Since the ID pulse 154 is only of 2 milliseconds duration, the reset is removed after 2 milliseconds and, for the remainder (30 milliseconds) of the $Q_9$ time period, the counter 408 is conditioned to count the pulses received at its clock input C. Therefore, the status pulses subsequently received by AND gate 406 clock the counter 408 and a count is accumulated at its outputs, leaving the $Q_6$ output of counter 408 at the high logic level. At this time, latch 410 is storing the previous count. On the next step of the sequence counter 102 (the $Q_0$ interval) the latch 410 is enabled and the count is transferred to the appropriate LED's 68. In the instant example there is a full count (all six locomotives on line) and, therefore, the lowermost transistor 416 is driven into conduction to energize all six of the LED's 68.

Returning to the previous example under discussion where the engineer reduced power by throttling back the No. 5 trailing locomotive, the next interrogation signal will result in the generation of a changed status report. Only five pulses 402 (FIG. 6, fourth wave form diagram) will now appear at the collector of transistor 394 (FIG. 4) so five status pulses 404 will be counted rather than six. After counting, the $Q_5$ output of counter 408 is high which results in the deenergization of the lowermost LED 68 of the series shown in FIG. 5 (LED "6") since the next to the lowermost transistor 416 will now be energized. This changes the voltage standing on reset lead 70 since resistor 418 remains constant whereas the lowermost resistor 422 and LED 68 have been removed from the circuit from line 70 to ground. This is a voltage change of 2 volts as previously described and, in this instance, the voltage drops 2 volts. This voltage change is sensed by the reset circuitry in FIG. 3 which resets flip-flop 86 to, in turn, force the output of AND gate 94 low. Therefore, the count in counter 98 progresses no further and the output of DAC 104 now remains constant. Accordingly, execution of the subtract power command now ceases. It should be noted, however, that execution ceased only after the status report from the on-line locomotives indicated that one of the locomotives (No. 5 trail) had been cut out.

Additionally, the resetting of flip-flop 86 removes the high logic level from the SUBTRACT lead. This causes levels II and IV to increase 5 volts to the values at which they will remain until a subsequent command. This is done to ensure that only one locomotive will be cut out. It may be recalled that both levels II and IV have to be less than 6 volts at a control unit in order to cut out a locomotive; therefore, this 5 volt increase will not put that locomotive back on line even though level IV at that unit may rise above 6 volts.

If the engineer desires a further power reduction, depressing the subtract power push button 22 again will cause the No. 4 trailing locomotive to be throttled back and effectively removed from the consist. Each time the subtract power push button 22 is depressed, another locomotive is cut out, and this may continue until only the lead locomotive remains. Conversely, locomotives will be added on line, one at a time, from the front by depressing the add power push button 24. The action is similar to the subtract function, except that flip-flop 90 is now set and the logic level at the up/down input of counter 98 remains low, so counter 98 counts down instead of up. The ADD lead from the Q output of flip-flop 90 goes high and instantly supplies increased current to the noninverting input of operational amplifier 164 (FIG. 4) to cause an instantaneous 5 volt increase in levels II and IV of the cutout control signal. Once the command is executed and flip-flop 90 is reset, the ADD lead goes low and levels II and IV back off 5 volts to the levels at which they remain until a subsequent command. As in the subtract mode, this is done to ensure that only one locomotive is added in response to the add power command.

The operation of certain portions of the system will now be described in greater detail. Referring to FIG. 4, it may be seen that the operational amplifier 200 of the interrogation signal generator 34 has its inverting input connected to the $Q_8$ output of sequence counter 102 as well as the $Q_9$ output thereof. This is done since the inverting input must reach a certain positive level (2 volts, for example) before amplifier 200 will function as an integrator. This is accomplished during the $Q_8$ interval by the connection comprising resistor 202 so that the ramp voltage 208 from the output of amplifier 200 is produced during the $Q_9$ interval, at which time such output goes from 12 volts to less than one volt. The slope of the ramp is set by the time constant of resistor 204 and capacitor 206. Representative values are 120,000 ohms and 0.22 microfarad respectively.

In order to interrupt the cutout control signal, the FET switches 166 and 176 open and the FET switch 198 closes. This is accomplished by the $Q_9$ output of sequence counter 102 since, due to the action of inverter 188, the positive voltage at the control inputs 168 and 178 of FET switches 166 and 176 is removed when the $Q_9$ output goes high. Conversely, when the $Q_9$ output goes high, it applies the positive voltage to the control input 196 of FET switch 198 to close this switch and connect the output of operational amplifier 200 to the inverting input of amplifier 164.

Referring to the status responder circuitry 62 shown in FIG. 10, the capacitor 346 is normally charged and maintains the noninverting type of comparator 338 at +12 volts. In order for the comparator 324 to respond to the 15 volt threshold (at junction point 242, FIG. 9) and drive the noninverting input of comparator 338 below +8 volts to trigger the one shot 316, the output of comparator 326 must stay at the open circuit condition (the 6 volt threshold) for a sufficiently long period of time to permit the capacitor 346 to discharge through resistor 350. Therefore, the circuitry is insensitive to noise but is responsive to the voltage ramp 330 of the interrogation signal because it ignores fast wave form changes by requiring that a level of 6 to 15 volts be maintained for longer than 0.75 millisecond and that the wave form does not reach the 21 volt level within 0.2 millisecond. As previously described, the comparators 324 and 326 control the 6 to 15 volt window, and comparator 328 responds to the 21 volt level to provide an override.

To illustrate the action of the 6 to 15 volt window, it will be assumed that the voltage is beginning to increase at junction point 242 in response to the voltage ramp 330 of the interrogation signal. The output of comparator 326 is still at ground; accordingly, the left plate of capacitor 346 is likewise at ground and the capacitor is charged. When the 6 volt level is reached, the output of comparator 326 goes to the open circuit condition and the ground on capacitor 346 is released. The right plate of the capacitor 346 is clamped by diode 354 and thus is held substantially at 12 volts. The capacitor 346 begins to discharge through resistor 350. Since the voltage increase in response to the ramp 330 is relatively slow, the capacitor 346 will be discharged by the time that comparator 324 responds at the 15 volt level. When this occurs, the output of comparator 324 goes to ground and this ground is coupled over to the capacitor 346 through diode 358. Therefore, the right plate of capacitor 346 instantly goes to ground to force the noninverting input of comparator 338 well below +8 volts, thereby tripping comparator 338 to trigger the one shot 316. However, a rapid voltage increase on the trainline that does not hold the window open for a time sufficient to discharge capacitor 346 will not result in the tripping of comparator 338 even though the pulse exceeds 15 volts and comparator 324 responds.

The 9 volt window also minimizes firing of the one shot 316 during the $Q_0$ through $Q_8$ periods which would unnecessarily load the output amplifier 30 (FIG. 4). Although such firing would not be meaningful since the counter 408 in FIG. 5 can only count status pulses during the $Q_9$ period, unnecessary loading of the output amplifier is to be avoided. For example, the status report logic circuitry 314 would arm on level III (essentially 0 volts) of the cutout control signal and would fire on level II when level II is between 15 and 21 volts at junction point 242 of the control unit, if only comparator 324 (responsive to the 15 volt threshold) were employed along with comparator 328.

If the locomotive is cut out, the status responder 62 does not cause a current pulse to appear on the trainline due to the disable function executed by line 64 extending from the decoder logic 50 (FIG. 9). When line 64 is at +12 volts, the relay 54 is energized and the locomotive is throttled back. This positive 12 volts on line 64 also drives transistor 370 in FIG. 10 into conduction and clamps the left plate of capacitor 346 to ground. Therefore, there will be no response to the interrogation signal.

Referring to FIG. 3, the manner in which either the flip-flop 86 or the flip-flop 90 is reset by the voltage change on reset line 70 (caused by a changed status report) will now be described. The 2 volt change, if in a negative direction, causes a negative spike to appear at junction point 118 (the output of the differentiator 114, 116). This perturbs the voltage at a junction point 424 where the resistors 122, 124 and 140 are joined, but does not change the voltage at junction point 134 since this is held by the charge across capacitor 136. Both the inverting input of operational amplifier 130 and the noninverting input of operational amplifier 132 are connected to junction point 134. However, the noninverting input of amplifier 130 (via resistor 122) and the inverting input of amplifier 132 (via resistor 124) are connected to the junction point 424. In the absence of an input the voltages at points 134 and 424 are essentially the same. Accordingly, amplifier 132, whose output is normally at the high logic level, responds to a negative spike and its output goes low to actuate the NAND gate 148 and reset the flip-flop 86. Similarly, amplifier 130 responds to a positive spike and its output goes low to actuate NAND gate 144 and reset flip-flop 90. The cross connections to the other inputs of NAND gates 144 and 148 from the push buttons 22 and 24 permit the engineer to change his mind and reverse the command if he does so before the first command is executed.

Although a consist of six locomotives has been selected for illustration of the operation of the system of the present invention, it may be appreciated that the system may be employed with a lesser number of trailing locomotives under control or with a greater number within the limits of the 74 volt control level range provided by the cutout control signal. Furthermore, trailing locomotives not equipped with the control units of the system may be included in the consist. In the event of a malfunction or if for any reason it is desired to exclude an equipped locomotive from the locomotives under control in the consist, the run-isolate switch 80 may be thrown to the "isolate" position to deactivate the system. Engagement of pole 80b of switch 80 with its lower contact disconnects relay 54 from the relay amplifier 52 and disables the status responder 62 via line 82 to the clamping transistor 370 (FIG. 10).

It should also be appreciated that the system will not cause the loss of a locomotive due to malfunction or leakage on the trainline. If there is a short on the trainline, it is at circuit ground and the identification pulse will not be received by the decoder 50 so the identifier pulse is, in effect, lost. If there is leakage on the trainline to +74 volts, then the voltage level is well above the 6 volt levels which the control signal voltage must be below to cut a locomotive out. Therefore, in the case of either a short or a leakage to +74 volts, a locomotive cannot be cut out and any locomotive that is off line will be returned to on-line status and thus will follow the throttle setting of the lead locomotive. Accordingly, under either condition the system automatically returns the consist to conventional control by the engineer.

Having thus described the invention, what is claimed as new and desired to be secured by Letters Patent is:

1. Apparatus for controlling the number of on-line locomotives of a consist thereof having a lead locomotive and a plurality of trailing locomotives, where each locomotive has a predetermined, efficient high throttle position and a desired low throttle position, said apparatus comprising:

a plurality of control units including a lead unit for said lead locomotive and at least a first trail unit and a second trail unit for controlling the throttles of corresponding first and second trailing locomotives, an electrical control line extending from said lead unit to said trail units in serial order, said lead unit including operator-activated means for producing either a subtract power command or an add power command to subtract from or add to the number of on-line locomotives of the consist, means for generating a cutout control signal and transmitting the same to said trail units along said control line, and control means for providing said signal with a magnitude that progressively changes in one direction in response to said subtract command and in the opposite direction in response to said add command, each of said trail units having a decoder responsive to the magnitude of said signal for setting the respective locomotive throttle at either the high position to put the locomotive on line or the low position to cut it out, said trail units being provided with means responsive to said signal for changing the magnitude thereof in said one direction by a predetermined amount as said signal is conducted rearwardly in the consist from each trail unit to the next succeeding trail unit, whereby locomotives are successively throttled back from the rear of the consist and returned on line from the front, each of said trail units further having means connected with said control line for reporting the on-line or off-line status of the corresponding locomotive, said control means in the lead unit being responsive to the status report from said reporting means in the trail units for ceasing the progressive change in the magnitude of said signal when a trailing locomotive has been cut out or put on line, whereby one trailing locomotive at a time is either cut out or put on line in response to the subtract or add power command.

2. The apparatus as claimed in claim 1, wherein said lead unit further includes means responsive to said status report for indicating the number of locomotives on line.

3. The apparatus as claimed in claim 1, wherein said lead unit further includes interrogation means for periodically interrupting said control signal and transmitting an interrogation signal to said trail units along said control line, and wherein said reporting means in the trail units produce said status report in response to each interrogation signal.

4. The apparatus as claimed in claim 1, wherein said lead unit further includes interrogation means for periodically interrupting said control signal and transmitting an interrogation signal to said trail units along said control line, and wherein said reporting means in each trail unit has circuitry responsive to each interrogation signal for causing a pulse to appear on said control line when the corresponding locomotive is on line, the number of pulses from said reporting means in the trail units produced in response to interrogation constituting said status report.

5. The apparatus as claimed in claim 1, wherein said magnitude is a voltage that changes in said directions, and wherein said magnitude changing means comprises a voltage-responsive network in each of said trail units for causing a received signal to drop in voltage by said amount, said control line connecting the networks of said trail units in series to provide said voltage drop from unit to unit.

6. The apparatus as claimed in claim 5, wherein said lead unit further includes interrogation means for periodically interrupting said control signal and transmitting an interrogation signal to said trail units along said control line, said interrogation signal having a voltage that increases over a predetermined time duration, and wherein said reporting means in each trail unit has circuitry receiving each interrogation signal from said network of the unit and responsive to a predetermined voltage level thereof for causing a pulse to appear on said control line when the corresponding locomotive is on line, whereby pulses from said reporting means in the trail units are time spaced, the number of said pulses produced in response to interrogation constituting said status report.

7. The apparatus as claimed in claim 6, wherein said control means in the lead unit includes means for counting said pulses occurring in response to each interrogation signal, and means responsive to a change in the total count for effecting said ceasing of the progressive change in the magnitude of said control signal.

8. The apparatus as claimed in claim 7, wherein said lead unit further includes means responsive to said total count for indicating the number of locomotives on line.

9. The apparatus as claimed in claim 5, wherein said lead unit further includes interrogation means for periodically interrupting said control signal and transmitting an interrogation signal to said trail units along said control line, said interrogation signal having a voltage that increases over a predetermined time duration, and wherein said reporting means in each trail unit has circuitry receiving each interrogation signal from said network of the unit and defining a voltage window through which the interrogation signal must pass in a time period no less than a predetermined minimum duration, said circuitry including means responsive to a predetermined voltage level of each interrogation signal for causing a pulse to appear on said control line when the corresponding locomotive is on line and if the interrogation signal passes through said window in at least said minimum duration, whereby pulses from said reporting means in the trail units are time spaced, the number of said pulses produced in response to interrogation constituting said status report.

10. The apparatus as claimed in claim 1, wherein said control signal generating means has circuitry for providing said control signal with an identifier pulse portion that indicates that a received signal at said trail units is a valid control signal, and wherein the decoder of each of said trail units has means responsive to the absence of said identifier pulse for disabling the decoder to prevent cutout of the locomotive.

11. The apparatus as claimed in claim 1, wherein said control signal generating means has circuitry for providing said control signal with an identifier pulse portion of greater magnitude than said magnitude that changes in response to said subtract or add commands, and wherein the decoder of each of said trail units has a threshold detector responsive to said identifier pulse portion for conditioning the decoder for the reception and processing of valid control signals, and for disabling the decoder in the absence of said identifier pulse to prevent cutout of the locomotive.

12. The apparatus as claimed in claim 1, wherein said control means in the lead unit includes counter means which counts in one direction or the other in response to said subtract command or said add command respectively, and said control signal generating means includes circuitry for delivering said control signal and providing the same with said magnitude in accordance with the digital value contained in said counter means.

13. Apparatus for controlling the number of on-line locomotives of a consist thereof having a lead locomotive and a plurality of trailing locomotives, where each locomotive has a predetermined, efficient high throttle position and a desired low throttle position, said apparatus comprising:
a plurality of control units including a lead unit for said lead locomotive and at least a first trail unit and a second trail unit for controlling the throttles of corresponding first and second trailing locomotives,
an electrical control line extending from said lead unit to said trail units in serial order,
said lead unit including operator-activated means for producing either a subtract power command or an add power command to subtract from or add to the number of on-line locomotives of the consist, means for generating a cutout control signal and transmitting the same to said trail units along said control line, and control means for providing said signal with a magnitude that changes in one direction in response to said subtract command and in the opposite direction in response to said add command,
said control signal generating means having circuitry for providing said signal with an identifier pulse portion that indicates that a received signal at said trail units is a valid control signal,
each of said trail units having a decoder responsive to the magnitude of said signal for setting the respective locomotive throttle at either the high position to put the locomotive on line or the low position to cut it out, said decoder having means responsive to the absence of said identifier pulse for disabling the decoder to prevent cutout of the locomotive,
said trail units being provided with means responsive to said signal for changing the magnitude thereof in said one direction by a predetermined amount as said signal is conducted rearwardly in the consist from each trail unit to the next succeeding trail unit, whereby valid control signals cause locomotives to be successively throttled back from the rear of the consist and returned on line from the front.

14. The apparatus as claimed in claim 13, wherein said circuitry in the lead unit provides said identifier pulse portion with a greater magnitude than said magnitude of the control signal that changes in response to said subtract or add commands, and wherein said disabling means in the decoder of each trail unit has a threshold detector responsive to said identifier pulse portion for conditioning the decoder for the reception and processing of valid control signals.

15. The apparatus as claimed in claim 13, wherein said magnitude is a voltage that decreases in response to said subtract command and increases in response to said add command, said magnitude changing means comprising a voltage-responsive network in each of said trail units for causing a received signal to drop in voltage by said predetermined amount, said control line connecting the networks of said trail units in series to provide said voltage drop from unit to unit, and wherein said circuitry in the lead unit provides said identifier pulse portion with a greater voltage than the voltage of the control signal that changes in response to said subtract or add commands, said disabling means in the decoder of each trail unit having a threshold detector responsive to the voltage of said identifier pulse portion for conditioning the decoder for the reception and processing of valid control signals.

16. A method of controlling the number of on-line locomotives of a consist thereof having a lead locomotive and a plurality of trailing locomotives, where each locomotive has a predetermined, efficient high throttle position and a desired low throttle position, and where the trailing locomotives for control purposes are numerically designated in sequence beginning with the first trailing locomotive immediately behind the lead locomotive, said method comprising the steps of:
generating a cutout control signal in said lead locomotive and transmitting the control signal to the trailing locomotives in serial order;
providing said control signal with a characteristic that progressively changes in response to a substract power command or an add power command;
decoding said control signal at each trailing locomotive and setting the throttle thereof at either the high position to put the locomotive on line or the low position to cut it out;
modifying said characteristic of the control signal as it is transmitted from the first trailing locomotive to successive trailing locomotives, in a manner such that locomotives are successively throttled back from the rear of the consist and returned on line from the front;
periodically transmitting a status report from said trailing locomotives to said lead locomotive that indicates the on-line or off-line status of the corresponding locomotive; and
ceasing execution of said subtract or add power command when the status report indicates that a trailing locomotive has been cut out or put on line, whereby one trailing locomotive at a time is either cut out or put on line in response to the subtract of add power command.

17. The method as claimed in claim 16, wherein is provided the additional step of periodically interrogating said trailing locomotives to determine the on-line or off-line status thereof, and wherein said step of periodically transmitting a status report to the lead locomotive is accomplished in response to each interrogation.

18. The method as claimed in claim 16, wherein is provided the additional step of periodically generating an interrogation signal in said lead locomotive and transmitting the interrogation signal to the trailing locomotives in serial order to determine the on-line or off-line status thereof, and wherein said step of periodically transmitting a status report to the lead locomotive comprises responding to each interrogation signal with time spaced pulses from the on-line trailing locomotives.

19. Apparatus for controlling the number of on-line locomotives of a consist thereof having a lead locomotive and a plurality of trailing locomotives, where each locomotive has a predetermined, efficient high throttle position and a desired low throttle position, said apparatus comprising:

a plurality of control units for respective lead and trailing locomotives for controlling the throttles of the trailing locomotives, each of said units having operator-activated means for producing either a subtract power command or an add power command to subtract from or add to the number of on-line locomotives of the consist, and means for generating a cutout control signal having a characteristic that changes in response to said subtract and add commands, each of said units further having a pair of lines interconnected at a junction point and adapted for connection to corresponding trainline wires extending from said lines to the short and long hood trainline connectors respectively of the locomotive, an output lead connecting said control signal generating means with said junction point for transmitting said control signal thereto, and a decoder connected with said junction point and responsive to said control signal characteristic for setting the respective locomotive throttle at either the high position to put the locomotive on line or the low position to cut it out, each unit having means for rendering said control signal generating means operable when the unit is in the lead locomotive, whereby such lead unit is capable of generating said control signal and transmitting the same to the junction point therein for transmission to units in trailing locomotives, and means isolating said output lead from said junction point to prevent control signal conduction along said output lead away from said junction point, each unit being provided with means for disabling the decoder thereof when the unit is in the lead locomotive, whereby locomotives equipped with said control units may be employed as lead or trailing locomotives and the control units will respond without being especially set up for a lead unit or trailing unit function.

20. The apparatus as claimed in claim 19, wherein said characteristic is a magnitude of said control signal that changes in one direction in response to said subtract command and in the opposite direction in response to said add command, and wherein each of said lines of each unit has means therein causing said magnitude to change in said one direction by a predetermined amount as the control signal is conducted by the line away from said junction point, whereby locomotives are successively throttled back from the rear of the consist and returned on line from the front.

21. Apparatus for indicating the number of on-line locomotives of a consist thereof having a lead locomotive and a plurality of trailing locomotives, said apparatus comprising:

a plurality of units including a lead unit for said lead locomotive and a trail unit for each of said trailing locomotives, an electrical control line extending from said lead unit to said trail units in serial order, said lead unit including interrogation means for periodically transmitting an interrogation signal to said trail units along said control line, said interrogation signal having a voltage that increases over a predetermined time duration, said trail units including voltage-responsive means in each unit responsive to each interrogation signal for causing it to drop in voltage by a predetermined amount as said signal is conducted rearwardly in the consist from each trail unit to the next succeeding trail unit, each of said trail units having means for sensing the on-line or off-line status of the corresponding locomotive, and reporting means receiving each signal from said voltage-responsive means of the unit and responsive to a predetermined voltage level thereof for causing a pulse to appear on said control line when the corresponding locomotive is on-line, whereby pulses from said reporting means in the trail units are time spaced, said lead unit further including means responsive to said time spaced pulses for indicating the number of locomotives on line.

22. The apparatus as claimed in claim 21, wherein said indicating in the lead unit includes means for counting said time spaced pulses occurring in response to each interrogation signal, and means responsive to the total count accumulated in response to an individual interrogation signal for indicating the number of locomotives on line.

23. The apparatus as claimed in claim 21, wherein said reporting means in each trail unit has means defining a voltage window through which each interrogation signal must pass in a time period no less than a predetermined minimum duration in order to condition the reporting means for response to said predetermined voltage level.

* * * * *